United States Patent
Dancel et al.

(10) Patent No.: US 12,545,281 B2
(45) Date of Patent: Feb. 10, 2026

(54) VEHICLE OPERATOR MONITORING

(71) Applicant: Ford Global Technologies, LLC, Dearborn, MI (US)

(72) Inventors: Sophia Dancel, Rochester Hills, MI (US); Andrew Vaccariello, Canton, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 18/650,957

(22) Filed: Apr. 30, 2024

(65) Prior Publication Data
US 2025/0333075 A1 Oct. 30, 2025

(51) Int. Cl.
*B60W 50/16* (2020.01)
*B60W 40/08* (2012.01)

(52) U.S. Cl.
CPC .......... *B60W 50/16* (2013.01); *B60W 40/08* (2013.01); *B60W 2040/0818* (2013.01); *B60W 2540/223* (2020.02); *B60W 2540/225* (2020.02); *B60W 2540/229* (2020.02)

(58) Field of Classification Search
CPC .......... B60W 50/16; B60W 40/08; B60W 2040/0818; B60W 2540/223; B60W 2540/225; B60W 2540/229
See application file for complete search history.

(56) References Cited

U.S. PATENT DOCUMENTS

| | | | |
|---|---|---|---|
| 9,937,929 B2 | 4/2018 | Wulf | |
| 10,991,242 B2* | 4/2021 | Taylor | H04Q 9/00 |
| 11,017,249 B2 | 5/2021 | Yu et al. | |
| 11,548,514 B2 | 1/2023 | An et al. | |
| 12,246,740 B2* | 3/2025 | Verma | B60W 40/09 |
| 2020/0017124 A1 | 1/2020 | Camhi et al. | |
| 2021/0232901 A1* | 7/2021 | Rundo | G06N 3/094 |
| 2023/0106487 A1* | 4/2023 | Alexander | B60W 50/16 |
| | | | 340/576 |
| 2024/0010277 A1* | 1/2024 | Karve | B62D 5/30 |
| 2024/0025450 A1* | 1/2024 | Churay | B60W 30/18163 |

OTHER PUBLICATIONS

Khan, M, et al., Gaze and Eye Tracking: Techniques and Applications in ADAS, sensors, Dec. 14, 2019, 47 pages.
Müller-Tomfelde, C, "Takeover at Level 3 Automated Driving," Visteon, 2019, 5 pages.

* cited by examiner

*Primary Examiner* — Mohamed Barakat
(74) *Attorney, Agent, or Firm* — Frank A. MacKenzie; Brooks Kushman P.C.

(57) ABSTRACT

A computer in a vehicle can determine a monitoring time and an attentiveness window. Upon detecting attentiveness of an operator for the duration of the attentiveness window, the monitoring time is increased by an adjustment increment and a counter is incremented. Upon detecting inattentiveness of the operator during the duration of the attentiveness window, the counter is incremented. Upon expiration of the monitoring time, a component in the vehicle is actuated based on the inattentiveness of the operator. The monitoring time can be initiated for a vehicle operator assistance feature such as hands-free operation.

20 Claims, 4 Drawing Sheets

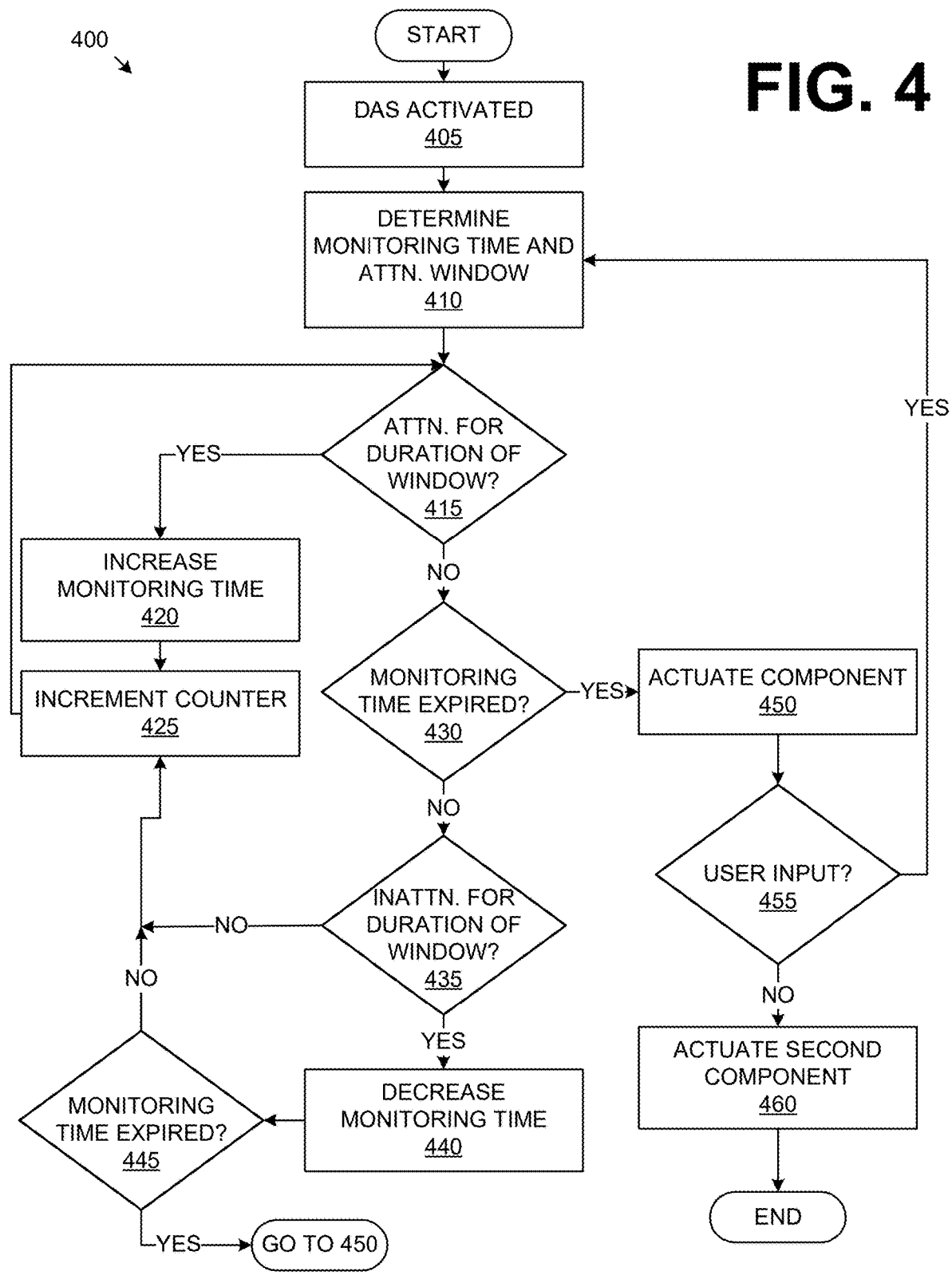

VEHICLE OPERATOR MONITORING

BACKGROUND

Vehicles can operate in various autonomous or semi-autonomous modes in which one or more components such as a propulsion, a brake system, and/or a steering system of the vehicle are controlled by a vehicle computer. For example, The Society of Automotive Engineers has promulgated standard J3016, "Levels of Driving Automation™," including six levels ranging from zero to five. At SAE Level 0, a human driver controls all of steering, braking, and acceleration. At SAE Level 5, a computer controls all of these operations within every driving environment, and a human may not even be present in the vehicle. There are various levels in between SAE Levels 0 and 5. At SAE Level 3, a computer may control steering and vehicle speed, but a human driver may be required to resume control when requested by the computer. For example, in a hands-free mode, a vehicle operator may be allowed to remove their hands from the vehicle steering wheel while the vehicle computer is controlling steering. However, the operator is expected to resume control when determined by the computer that the operator should do so.

BRIEF DESCRIPTION OF THE DRAWINGS

FIG. 4 is a diagram of an example process for operating a vehicle based on vehicle operator attentiveness.

DETAILED DESCRIPTION

Figure 1:
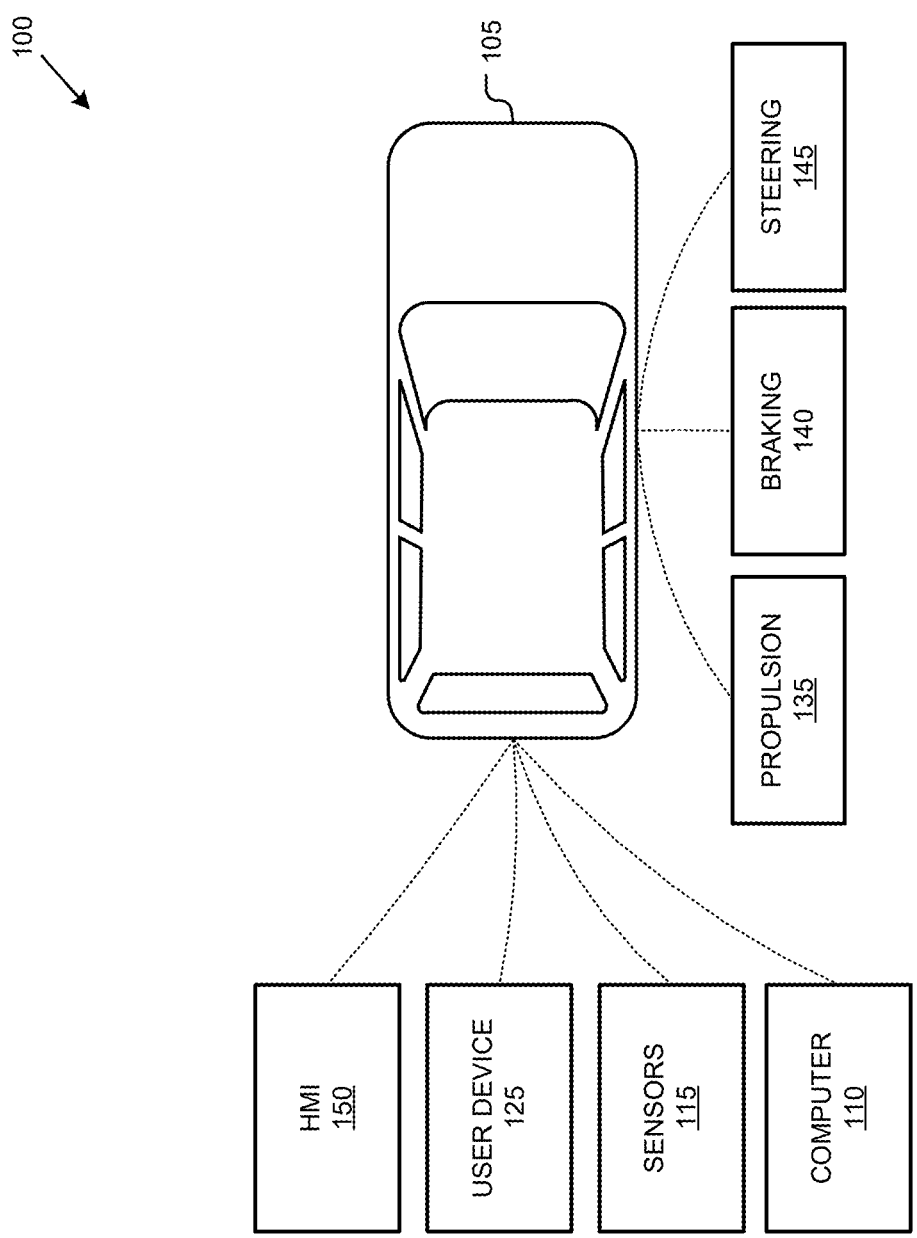
FIG. 1 is a block diagram of an example vehicle system.

A vehicle can include a Driver Assistance System (DAS) wherein a vehicle computer performs one or more vehicle operations that therefore do not require input by a human operator while the computer is performing them. In examples, a DAS could provide speed control, i.e., the DAS could include a cruise control or adaptive cruise control system. In other examples, the DAS could provide a hands-free driving mode, typically along with speed control. A driver state monitor (DSM) may provide output specifying that an operator is in an attentive state or in an inattentive state during operation of the DAS. The vehicle computer can include programming to determine the attentive state or inattentive state during a time window, referred to herein as an attentiveness window, that is a subset, i.e., less than all, of a monitoring time. Based on whether attentive or inattentiveness is detected during the attentiveness window, the computer may make adjustments to the monitoring time and/or actuate one or more vehicle components. In one example, the attentiveness window is five minutes, monitoring time is twenty minutes, and the computer could be programmed to deactivate the DAS and/or activate various outputs, such as vibrating a seat or a steering wheel, upon detecting inattentive for more than five minutes. Further in this example, if the computer detects attentiveness for an entire duration of the attentiveness window of five minutes, the monitoring time could be extended, e.g., for five more minutes.

A system comprises a processor and a memory, the memory storing instructions executable by the processor to detect activation of a vehicle operator assistance system; determine a monitoring time and an attentiveness window; upon detecting attentiveness of an operator for the duration of the attentiveness window, increase the monitoring time by an adjustment increment and increment a counter; upon detecting inattentiveness of the operator during the duration of the attentiveness window, increment the counter; and upon expiration of the monitoring time, actuate a component in the vehicle based on the inattentiveness of the operator.

The instructions can further include instructions to, upon detecting inattentiveness of the operator for the duration of the attentiveness window, decrease the monitoring time by the adjustment increment. The attentiveness window can be defined based on the adjustment increment and/or can be the same as the adjustment increment.

The instructions to actuate a component in the vehicle can include instructions to deactivate the vehicle operator assistance system, to activate a vehicle steering system, to activate vibration of a seat and/or a steering wheel, and/or to actuate a component in the vehicle include instructions to provide output via a vehicle human interface.

The instructions can further include instructions to, after expiration of a second monitoring time without receiving operator input, actuate a second component in the vehicle, wherein the second monitoring time can be measured from expiration of the monitoring time.

The monitoring time and/or the attentiveness window can be determined based on a location of a vehicle, based on data about the operator, and/or based on sensor data about an environment around the vehicle.

The attentiveness of the operator can be determined based on detecting a gaze and/or a pose of the operator.

The vehicle operator assistance system can provide hands-free driving.

A method comprises detecting activation of a vehicle operator assistance system; determining a monitoring time and an attentiveness window; upon detecting attentiveness of an operator for the duration of the attentiveness window, increasing the monitoring time by an adjustment increment and incrementing a counter; upon detecting inattentiveness of the operator during the duration of the attentiveness window, incrementing the counter; and upon expiration of the monitoring time, actuating a component in the vehicle based on the inattentiveness of the operator.

The method may further comprise, upon detecting inattentiveness of the operator for the duration of the attentiveness window, decreasing the monitoring time by the adjustment increment.

The attentiveness window can be defined based on the adjustment increment and/or can be the same as the adjustment increment.

Actuating a component in the vehicle can include deactivating the vehicle operator assistance system, activating a vehicle steering system, activating vibration of a seat and/or a steering wheel, or providing output via a vehicle human interface.

The method can further comprise, after expiration of a second monitoring time without receiving operator input, actuating a second component in the vehicle, wherein the second monitoring time can be measured from expiration of the monitoring time.

The monitoring time and/or the attentiveness window can be determined based on a location of a vehicle, data about the operator, and/or data about an environment around the vehicle.

FIG. 1 illustrates an example system 100 for a vehicle 105. A computer 110 in the vehicle 105 is programmed to receive data collected from one or more sensors 115, and other sensors (not shown), to provide certain vehicle data. For example, one or more camera sensors 115 may provide image data from a camera's field of view. A user device with a touch screen may be disposed in vehicle 105. Example user devices include a vehicle computer 110 communicatively coupled (e.g., via a vehicle network) to an HMI 150 with a touch screen installed as part of a vehicle 105 infotainment system, or a hand-held portable computing device 125 with a touch screen. While all modern original equipment manufacturers (OEMs) of passenger vehicles currently warn drivers against using a hand held portable device while driving a vehicle due to safety concerns, it is anticipated that technology and the regulatory framework may evolve in the future to where such an activity becomes safe and permissible.

Vehicle data may further include a location of the vehicle 105, data about an environment around a vehicle, data about an object outside the vehicle such as another vehicle, etc. A vehicle location may be provided in a conventional form, e.g., geo-coordinates such as latitude and longitude coordinates obtained via a navigation system that uses a global navigation satellite system (GNSS) such as the Global Positioning System (GPS) system. Further examples of vehicle data can include measurements of vehicle systems and components, e.g., a vehicle speed or velocity, a level of fuel in a fuel tank, etc.

A computer 110 can be provided to control one or more vehicle operations including steering, acceleration or speed control, and/or braking. Accordingly, system 100 is shown comprising vehicle 105 which may include Driver Assistance System (DAS) features. A computer 110 (e.g., one or more vehicle 105 ECUs) can be configured to operate the vehicle 105 independently of operation by an occupant with regard to certain features. A computer 110 may be programmed to provide a driver assistance system (DAS) such as cruise control (where the computer maintains vehicle speed according to a set speed), adaptive cruise control (ACC) (where the computer maintains the vehicle speed according to a set speed but can adjust vehicle speed based on detected distances and/or speeds of other vehicles), and/or hands-free driving. For example, the computer 110 could provide hand-free driving in combination with ACC such that the computer 110 controls steering, braking and acceleration. The computer 110 may be programmed to operate a propulsion system 135, a braking system 140, a steering system 145, a device screen that displays a Human Machine Interface (HMI) 150, and/or other vehicle systems.

A computer 110 is generally programmed for communications on a vehicle network, for example, a conventional vehicle communications bus such as a Controller Area Network (CAN) bus, a Local Interconnect Network (LIN) bus, etc., and/or other wired and/or wireless technologies, e.g., Bluetooth®, Wi-Fi®, Ethernet, etc. Via the network, bus, and/or other wired or wireless mechanisms (e.g., a wired or wireless local area network in the vehicle 105), the computer 110 may transmit messages to various devices in the vehicle 105 and/or receive messages from the various devices, e.g., sensors 115, controllers and actuators (not shown), etc.

Alternatively or additionally, for example, in cases where the computer 110 actually comprises multiple devices, the vehicle network may be used for communications between devices represented as the computer 110 in this disclosure. For example, the computer 110 can be a generic computer with a processor and memory as described above, and/or may include a dedicated electronic circuit including an application specific integrated circuit (ASIC) that is manufactured for a particular operation, e.g., an ASIC for processing sensor data and/or communicating the sensor data.

In another example, the computer 110 may include a Field-Programmable Gate Array (FPGA), which is an integrated circuit manufactured to be configurable by a user. Typically, a hardware description language such as Very high speed integrated circuit Hardware Description Language (VHDL) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with a network and/or devices outside of the vehicle (not shown), which may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve data stored in the memory via a network in the vehicle 105, e.g., over a CAN bus, a wireless network, etc. Alternatively or additionally, the memory can be part of the computer 110, e.g., as a memory of the computer 110.

Figure 2:
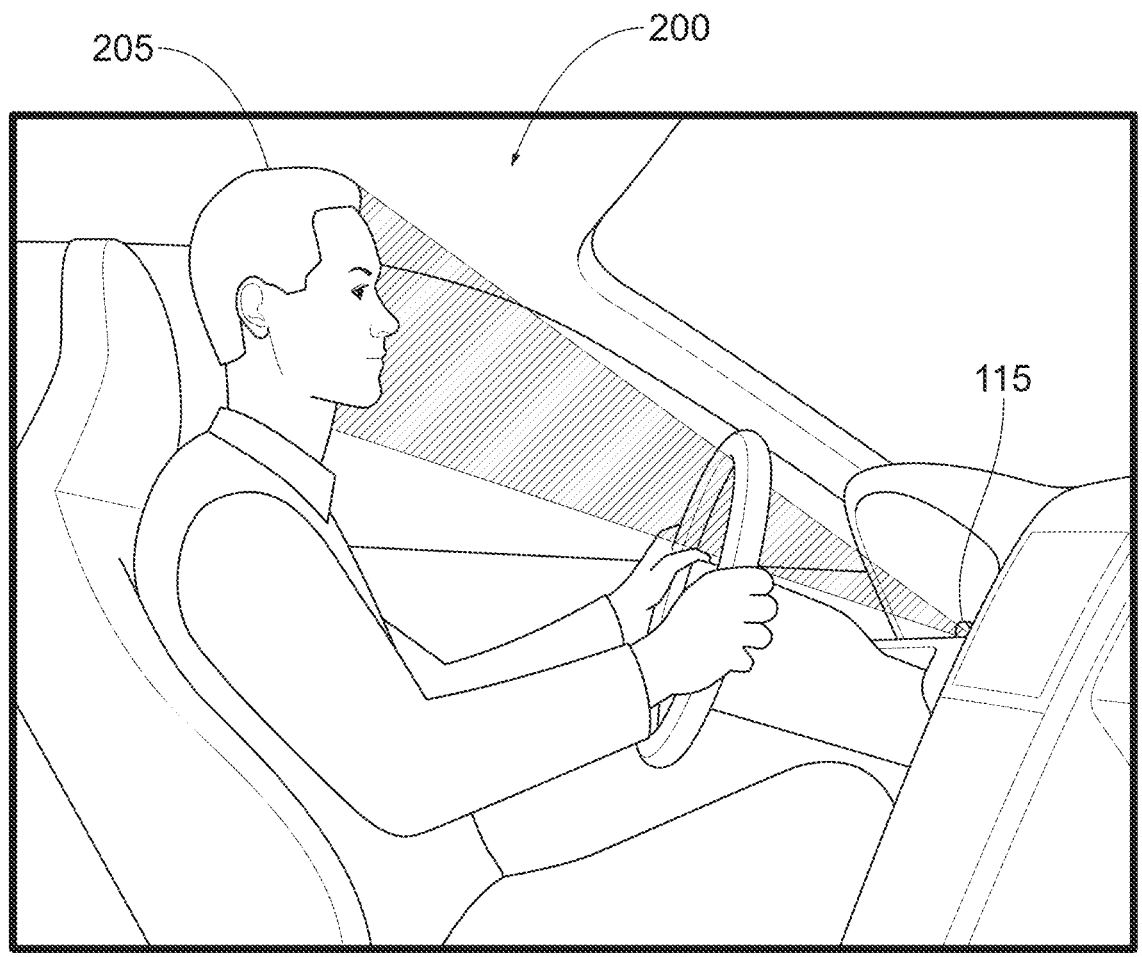
FIG. 2 illustrates a vehicle operator in an attentive state.

Sensors 115 can include a variety of devices, such as BCC sensors 230 (see FIG. 2). Further for example, various controllers in a vehicle 105 may operate as sensors 115 to provide data via the vehicle network or bus, e.g., data relating to vehicle speed, acceleration, location, subsystem and/or component status, etc. Further, other sensors 115 could include cameras, motion detectors, etc., i.e., sensors 115 may provide data for evaluating a status of a component, evaluating a slope of a roadway, etc. The sensors 115 could, without limitation, also include short range radar, long range radar, light detection and ranging (LIDAR), ultrasonic transducers, and the like. Cameras herein typically are optical cameras, e.g., in the visible spectrum, but could alternatively or additionally include other kinds of cameras, e.g., time-of-flight, infrared, etc.

Collected data can include a variety of data collected in a vehicle 105. Examples of collected data are provided above. Data are generally collected using one or more sensors 115, and may additionally include data calculated therefrom in the computer 110. In general, collected data may include any data gathered by the sensors 115 and/or computed from such data.

The vehicle 105 can include a plurality of vehicle components. In this context, a vehicle component may include one or more hardware components adapted to perform a mechanical function or operation—such as moving the vehicle 105, slowing or stopping the vehicle 105, steering the vehicle 105, etc. Non-limiting examples of components include a propulsion component 135 (that includes, e.g., an internal combustion engine and/or electric motor, etc.), a transmission component, a steering assembly (e.g., that may include one or more of a steering wheel, a steering rack, etc.), a brake component 140, a park assist component, an adaptive cruise control component, an adaptive steering component 145, a movable seat, and the like. Components can include computing devices, e.g., electronic control units (ECUs) or the like and/or computing devices such as described above with respect to the computer 110, and that likewise communicate via a vehicle network.

The HMI 150 typically includes one or more of a display, a touchscreen display, a microphone, a speaker, etc. The user can provide input to devices such as the computer 110 via the HMI 150. The HMI 150 can communicate with the computer 110 via the vehicle network, e.g., the HMI 150 can send a message including the user input provided via a touchscreen, microphone, a camera that captures a gesture, etc., to a computer 110, and/or can display output, e.g., via a screen, speaker, etc.

A computer 110 can include a driver state monitor (DSM) to determine data about an operator. In the present context, any suitable DSM could be implemented. A DSM typically can provide data such as an operator gaze direction and or a pose, which can include a position (i.e., a location, e.g., with respect to a coordinate system for a vehicle interior) and an orientation (e.g., rotations in X, Y, and Z planes with respect to a coordinate system such as for a vehicle interior). The pose can be of an operator's head, for example. A DSM typically takes as input image data from one or more image sensors 115 (typically optical cameras). For example, it will be understood that a computer 110 could detect a gaze direction of the operator in the image data, e.g., by using any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information. (For example, applicable techniques are discussed in Anuradha Kar and Peter Corcoran, "A Review and Analysis of Eye-Gaze Estimation Systems, Algorithms and Performance Evaluation Methods in Consumer Platforms," IEEE, 2017, available at the time of filing at https://arxiv.org/ftp/arxiv/papers/1708/1708.01817.pdf; see also Muhammad Qasim Khan and Sukhan Lee, "Gaze and Eye Tracking: Techniques and Applications in ADAS," National Library of Medicine, December 2019, available at the time of filing at https://www.ncbi.nlm.nih.gov/pmc/articles/PMC6960643/.) Then the computer 110 can use outputs produced as a byproduct of the facial detection that indicate the gaze direction of the eyes.

Further, a DSM implemented in a vehicle computer 110 could determine the actual pose for the occupant based on sensor 115 data using any suitable technique. For example, the vehicle computer 110 can obtain an image from an image sensor 115 positioned to face the occupant when the occupant is seated inside the vehicle 105. The vehicle computer 110 can then input the image to a machine learning program that identifies keypoints. The machine learning program can be a conventional neural network trained for processing images, e.g., OpenPose, Google Research and Machine Intelligence (G-RMI), DL-61, etc. For example, OpenPose receives, as input, an image and identifies keypoints in the image corresponding to human body parts, e.g., hands, feet, joints, etc. OpenPose inputs the image to a plurality of convolutional layers that, based on training with a reference dataset such as Alpha-Pose, identify keypoints in the image and output the keypoints. The keypoints include depth data that the image alone does not include, and the vehicle computer 110 can use a machine learning program such as OpenPose to determine the depth data to identify the actual pose of the occupant in the image. That is, the machine learning program outputs the keypoints as a set of three values: a length along a first axis of a 2D coordinate system in the image, a width along a second axis of the 2D coordinate system in the image, and a depth from the image sensor 115 to the vehicle occupant, the depth typically being a distance along a third axis normal to a plane defined by the first and second axes of the image. The vehicle computer 110 can then connect the keypoints, e.g., using data processing techniques, to determine the actual pose of the occupant.

In implementations, a DSM using gaze detection to determine attentiveness or inattentiveness could be replaced or modified with a DSM that uses alternative or additional inputs to determine attentiveness or inattentiveness. For example, a vehicle computer 110 could additionally monitor operator interactions with various vehicle 105 components, such as by monitoring virtual and/or physical input mechanisms, such as buttons, switches, levers, etc., on a vehicle 105 steering wheel, touchscreen display, dashboard panel, etc. operator interaction with certain components. Various virtual and/or physical controls could be categorized for determinations of attentiveness and/or inattentiveness. For example, an operator interacting with certain controls on a center console touchscreen could be used to determine attentiveness, whereas an operator failing to interact with these same controls for a specified period of time could be used to determine inattentiveness. Operator "interaction" typically means an operator is touching, and/or gazing at, a control. Continuing the example, certain virtual buttons on a vehicle 105 infotainment touchscreen could cause the DSM to determine that the operator is attentive, e.g., interaction with virtual buttons on a touchscreen, e.g. to control vehicle operations, or interaction with a physical button on a steering wheel, e.g., to adjust vehicle 105 speed. Yet further, as an alternative, or in addition, to a camera sensor 115 being used to monitor occupant gaze, one or more camera sensors 115 could be used to monitor other occupant body parts, such as a hand or hands of the occupant. For example, if the hand or hands were determined to remain within a specified area or space, and/or be performing a specific action (e.g. operating a hand-held device), in the vehicle 105, then the DSM could determine an attentiveness state. If the hand or hands were determined to were determined to move outside of the specified area or space and/or be stationary or performing an action not associated with driver attentiveness, then the DSM could determine an inattentiveness state. In some implementations, a logic could be implemented in a DSM to consider multiple factors in determining attentiveness or inattentiveness, such as gaze detection in combination with whether an operator's hands are within or without a specified area or space of the vehicle 105, or gaze detection in combination with whether an operator has accessed, during an attentiveness window, a specified vehicle component such as a button or switch on a steering wheel.

Figure 3:
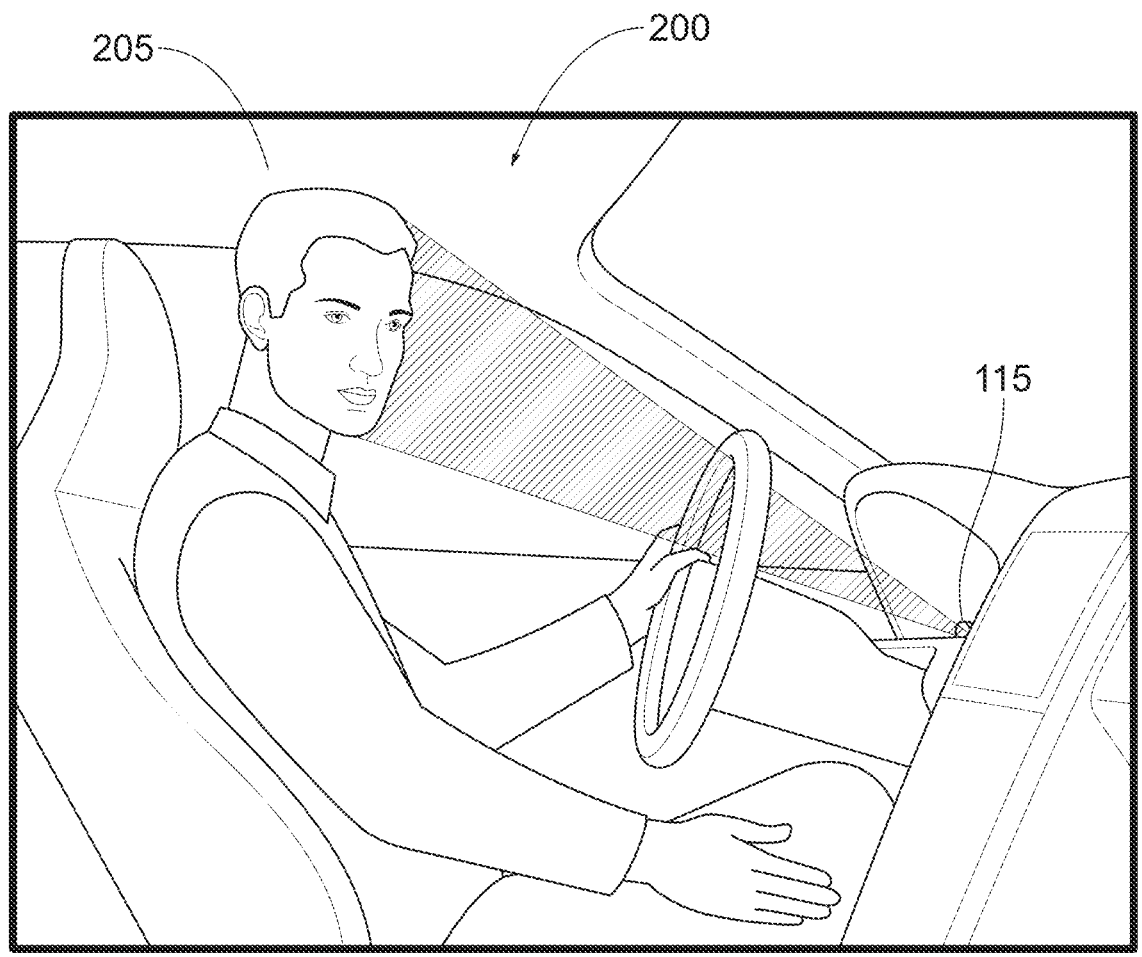
FIG. 3 illustrates a vehicle operator in an inattentive state.

FIG. 2 is an example illustration of a vehicle operator in an attentiveness state, while FIG. 3 is an example illustration of a vehicle operator in an attentiveness state. An attentiveness state means that the operator has been determined to be in a state such that the operator could practically instantaneously, or very quickly, e.g., within a few seconds, assume control of a vehicle 105. An inattentiveness state means that the operator means that the operator has been determined to be in a state such that the operator likely could not practically instantaneously or very quickly assume control of the vehicle 105.

An attentiveness or inattentiveness state can be determined based on output from a DSM, e.g., by monitoring an operator's body state, including a gaze direction, a pose (e.g., of the operator's head) and/or a location or position of the operator's hands, e.g., on or off a steering wheel. For example, an operator's gaze direction can be used to determine an attentiveness or inattentiveness state. The "gaze" of the occupant can be determined using a suitable technique such as discussed above to determine a line, a vector, or a cone of confidence along which the occupant's eyes are directed, e.g., toward the road ahead, toward a vehicle display, in some other direction, etc. Alternatively or additionally, the operator's head pose could be determined by a suitable technique as discussed above, and a range of orientations associate with looking ahead at a roadway (and/or rearview mirrors or other components associated with operating the vehicle) could determine an attentiveness state (or, if a pose is not with the determined orientations, an inattentiveness state). Yet further, hands on a steering wheel could be associated with an attentiveness state and off a wheel could be associated with an inattentiveness state, possible in combination with a gaze direction and/or pose. Values for gaze direction, poses, with or without additional data about hands on or off a steering wheel, could be established via empirical testing. For example, with an operator in a test vehicle, gaze directions and/or head poses could be measured when the operator is known to be in an attentiveness state and also when the operator is known to be in an inattentiveness state. Ranges of gaze direction values and/or pose values could then be stored in the computer 110 for determining an attentiveness or inattentiveness state in real-time or near real-time. Further, an attentiveness state or an inattentiveness state could depend on operator characteristics, such as a height of the operator, a preferred seat position, etc.

As seen in FIG. 2 wherein an operator 205 in a vehicle cabin 200 is in an attentiveness state. Data from a camera sensor 115 monitors the operator 205, and is used to determine that the operator's gaze direction and/or head pose is consistent with an attentiveness state. In FIG. 3, in contrast, the operator 205 is in an inattentiveness state, i.e., the operator's gaze direction and/or head pose is inconsistent with an attentiveness state. As noted above, any suitable DSM could be used to determine the attentiveness and inattentiveness states.

The computer 110 can monitor for attentiveness and inattentiveness states of a vehicle operator upon detecting activation of a vehicle operator assistance system, sometimes referred to herein as a driver assistance system (DAS). For example, an operator could provide input to activate a hands-free driving system, such as BlueCruise, offered by Ford Motor Company.

Upon detecting activation of a DAS, the computer 110 can determine a monitoring time and an attentiveness window, e.g., by retrieving these values from memory. A "monitoring time" herein means an amount or duration of time that a DAS is allowed to operate before requiring or prompting a vehicle operator to resume control of the DAS functions. For example, the monitoring time could be an amount of time that a hands-free driving system is allowed to operate. In an implementation, the monitoring time is twenty minutes. An "attentiveness window" herein means an amount or duration of time during which an operator is monitored for inattentiveness state. In an implementation, the attentiveness window is five minutes.

The monitoring time and the attentiveness window can be respective values stored in a memory of the computer 110. For example, the monitoring time and the attentiveness window could be determined by a vehicle manufacturer, e.g., based on simulations and/or empirical testing of vehicle operation to determine appropriate time spans for monitoring attentiveness and/or requesting operator resumption of control.

Alternatively or additionally, the monitoring time and the attentiveness window could be dynamically determined, i.e., at a time when a DAS is determined to be activated, based on one or more factors. For example, the monitoring time and/or the attentiveness window could be determined based on a location of a vehicle. A vehicle could include a location sensor 115, e.g., to provide a geo-location according to a global navigation satellite system (GNSS) such as the global positioning system (GPS). The computer 110 could then determine whether stored data for the location provided a monitoring time and/or inattentiveness window for the location, and/or adjustments to default values for the monitoring time and/or attentiveness window. For example, map data or other store data for a location could specify a monitoring time and/or attentiveness window based on a type of road (e.g., interstate highway, non-restricted divided highway, two-lane road, etc.) and/or a topography, e.g., hilly, flat, curvy, and/or straight, etc.

Yet further alternatively or additionally, the monitoring time and/or the attentiveness window could be determined based on data about the operator. For example, the monitoring time and/or attentiveness window could be based on an operator age. In one implementation, the monitoring time and the attentiveness window can be shorter for younger operators and/or older operators, and longer for other operators. For example, ranges of operator ages could be determined, such as a first range from age 16 or 17 (e.g., a first age when an operator is licensed) to age 30, a second range from age 30 to 60, and a third range from age 60 upward. The monitoring time and attentiveness window for the second range could be 20 minutes and 5 minutes, respectively. Then the monitoring time and the attentiveness window for the first range could be 10 minutes and 2 minutes respectively, and could be the same for the third range, or in the third range could be slightly longer, e.g., 12 minutes and three minutes, respectively.

Yet further alternatively or additionally, the monitoring time and/or the attentiveness window could be determined based on sensor data about an environment around the vehicle. For example, the computer 110 could be programmed to reduce the monitoring time and/or attentiveness window upon detecting a level of ambient light around the vehicle below a threshold, e.g., in nighttime conditions. Alternatively or additionally, the computer 110 could take into account weather conditions, such as an amount and/or type of precipitation which could be determined using data from vehicle sensors 115 such as imaging sensors using any suitable technique. For example, the monitoring time and/or attentiveness window could be determined or reduced upon detecting rain and/or could be determined or reduced a different amount upon detecting snow. The amount of reduction could be determined empirically or based on simulation as described above.

If an operator is determined to maintain attentiveness state for an attentiveness window, i.e., upon the computer 110 detecting attentiveness of an operator for the duration of the attentiveness window, then the computer can increase the monitoring time by an adjustment increment and increment a counter. The computer may also be programmed to, upon detecting inattentiveness of the operator during the duration of the attentiveness window, increment the counter, but not, upon detecting the inattentiveness, increase the monitoring time. Further, the computer 110 may be programmed to, upon detecting inattentiveness of the operator for the duration of the time window, decrease the monitoring time by the adjustment increment.

The adjustment increment is an amount of time that can be stored in the computer 110 for adjusting, i.e., increasing or decreasing, the monitoring time. In an implementation, the adjustment increment is five minutes, which may be the same as the attentiveness window. The counter is used to track how much time has elapsed from a beginning of the monitoring time. Thus, to increment the counter can mean to store the amount of time that has elapsed since the monitoring time began.

In examples, the attentiveness window is defined based on the adjustment increment. For example, the attentiveness window is the same as the adjustment increment. That is, if the adjustment increment, i.e., an amount by which the monitoring time may be increased or decreased, is five minutes, the attentiveness window, i.e., an amount of time for which operator attentiveness is to be detected to increase the monitoring time, may be the same. Alternatively, the attentiveness window could be a multiple, e.g., 0.5, 1.5, 2, etc., of the adjustment increment. In general, the attentiveness window should be sufficiently long so as to provide some assurance or likelihood that an operator is paying sustained attentiveness to vehicle operations. For example, and attentiveness window of 30 seconds likely would be too short. Further, the attentiveness window should generally be related to both the monitoring time and the adjustment increment. That is, the attentiveness window is used to determine an amount of time that operator is paying attentiveness and to extend an amount of time for, e.g., hands-free operation. Therefore, if an operator is paying attentiveness for the attentiveness window, the operator should be rewarded with a commensurate or appropriate increase, i.e., according to the adjustment increment, of the monitoring time.

The computer 110 can further be programmed to, upon expiration of the monitoring time, actuate a component in the vehicle based on the inattentiveness of the operator. In this context, to actuate a component means to send a command to an actuator of a vehicle component, or to another computer, e.g., vehicle 105 ECU that controls an actuator of a vehicle component The vehicle component may be a component such as an HMI 150, or a propulsion 135, braking 140 and/or steering 145. For example, an HMI 150 could display a visual or audio message informing the vehicle operator to take control and that the DAS will be deactivated. In some examples, the visual or audio message could request operator input, such as placing hands on a steering wheel and/or gazing toward a road, in which case the computer 110 could resume or continue the DAS. Further, the vehicle component could be a vehicle seat and/or steering wheel that is actuated to vibrate and provide a haptic indication to the vehicle operator to place hands on a steering wheel and/or gaze in a direction of a roadway on which a vehicle 105 is traveling. Vehicle steering could also provide a haptic indication, e.g., the computer 110 could actuate oscillation of a steering rack to provide vibrations in a vehicle 105. Actuating a component in the vehicle 105 further could include the computer 110 providing a command, e.g., to another computer or ECU in the vehicle to deactivate the vehicle operator assistance system.

The computer 110 can be further programmed to actuate a second component in the vehicle upon determining, after expiration of a second monitoring time, that no operator input has been received. The second monitoring time is measured from the expiration of the monitoring time. The second monitoring time can be an amount of time, e.g., five seconds, 10 seconds, etc., determined to be a reasonable amount of time for an operator to provide the input.

FIG. 4 is a diagram of an example process 400 for operating a vehicle 105 based on vehicle operator attentiveness. The process 400 may be carried out according to instructions stored in a memory of the computer 110 and executed by a processor thereof.

The process 400 begins in a block 405, in which a driver assistance system (DAS) is activated in a vehicle 105 including the computer 110. Typically, the DAS is activated by operator input, e.g., the operator selecting a real or virtual button, switch, or the like, to activate the DAS, e.g., to select a hands-free operating mode.

Upon activation of the DAS, next, in a block 410, the computer 110 determines the monitoring time and the attentiveness window. As described above, these values could be stored in a memory of the computer 110. Further, they could be unchanging, but alternatively one or both values could be selected based on a vehicle 105 location, environment around the vehicle, etc.

Next, in a decision block 415, the computer 110 determines whether an operator is in an attentiveness state during a duration of the attentiveness window. For example, when a DAS is activated, the computer 110 may initiate a timer or timers to track progression of the monitoring time and the attentiveness window. During the attentiveness window, the computer 110 may determine, e.g., according to output of a driver state monitor (DSM) as described above, that an operator is in an attentiveness state. The computer 110 may also determine that an operator is in an inattentiveness state. If the computer 110 determines that the operator has remained in an attentiveness state for the duration of the attentiveness window, then the process 400 proceeds to a block 420. Otherwise, the operator has been detected to be in an inattentiveness state for some or all of the attentiveness window, and the process 400 proceeds to a block 430.

In an implementation in which the DSM considers factors in addition to gaze direction to determine operator attentiveness, a block 415 could include monitoring for whether the operator has taken some action or provided some input to indicate attentiveness, such as accessing a button control or the like on a steering wheel, placing hands on a steering wheel as detected by steering wheel contact sensors, or accessing a virtual control associated with attentiveness on a touchscreen, for example. Then in the block 415 if it is determined that the operator has taken some such action or input, then the process 400 could proceed to the block 420 even if the attentiveness window had not expired. On the other hand, if the operator took some action or provided some input indicating inattentiveness, such as accessing a passenger console infotainment touchscreen, then the process 400 could proceed to the block 430 without further monitoring for the duration of the attentiveness window. Alternatively, upon a DSM detecting an operator input to a component indicating attentiveness, or hands being in a location indicating attentiveness, the block 415 could reset the attentiveness window and/or the monitoring time, e.g., as if the block 415 were being initially entered. Further, upon a DSM detecting an operator input to a component indicating inattentiveness or hands being a location indicating inattentiveness, the block 415 could reduce the attentiveness window and/or the monitoring time, but not immediately proceed, i.e., the process 400 would proceed to the block 430 when another DSM factor such as gaze direction indicated inattentiveness, or to the block 420 if the attentiveness window elapsed without any further indication of inattentiveness.

In the block 420, the computer 110 increases the monitoring time according to the adjustment increment. For example, if the monitoring time was twenty minutes, and the adjustment increment was five minutes, then the monitoring time would be adjusted to twenty-five minutes. Note that, because five minutes of the monitoring time would have elapsed, the remaining monitoring time is twenty minutes in this example.

Following the block 420, in a block 425, the computer 110 increments the adjustment counter. For example, the adjustment counter may be initially set to zero. Further, if the adjustment increment is five minutes, incrementing the adjustment counter would result in the adjustment counter being set to five minutes. That is, the adjustment counter tracks how much of the monitoring time is elapsed for, put another way, how much monitoring time is remaining before expiration of the monitoring time.

Any decision block 430, which may follow the block 415, the computer 110 determines whether the monitoring time is expired. For example, if elapsed monitoring time is at or exceeds the initial monitoring time or the monitoring time as previously adjusted than the monitoring time is determined to be expired, and the process 400 proceeds to a block 450. If the monitoring time is not expired, the process 400 proceeds to a decision block 435.

In the decision block 435, the computer 110 determines whether the operator has been determined to be in an inattentiveness state for the duration of the attentiveness window. If no, then the process 400 transitions to the block 425. If yes, the process 400 transitions to a block 440. That is, the process 400 could transition from the block 415 to the block 430 after determining operator inattentiveness before the attentiveness window is expired, and then, assuming the monitoring time is not expired, to the block 435, whereupon, because operator inattentiveness had not been detected for the entire duration of the attentiveness window, the process 400 would then transition to the block 425. For example, if the attentiveness window is five minutes, and a DSM indicates inattentiveness after three minutes of a five-minute attentiveness window have elapsed, then the block 415 would transition to the block 430, and assuming that the monitoring time had not expired, and then to the block 435, whereupon in the block 435, the computer 110 would determine that inattentiveness had not been determined for the duration of the attentiveness window, and the process 400 which transition from the block 435 to the block 425. On the other hand, if the process 400 has transitioned to the block 430 from the block 415 after determining that an operator was in an inattentiveness state for an entire duration of inattentiveness window, then when the block 435 is reached, the process 400 will then transition to the block 440.

In the block 440, the computer 110 decreases the monitoring time according to the adjustment increment. For example, if the monitoring time were 20 minutes and the adjustment increment were five minutes, then in the block 440 the monitoring time would be decreased to 15 minutes. Following the block 440, the process 400 proceeds to a block 445.

Processing in the block 445 is the same as described for the block 430 above, except that a negative determination in the block 445, i.e., monitoring time not expired, leads to the block 425; a positive determination in the block 445, i.e., that monitoring time has expired, leads to the block 450.

In the block 450, the computer 110 actuates a vehicle component, e.g. as described above.

Following the block 450, in a decision block 455, the computer 110 determines whether user input has been received within a specified time. If yes, the process 400 returns to the block 410, where the DAS activated in the block 405 can continue with the monitoring of the process 400. If no, the process 400 proceeds to a block 460.

In the block 460, the computer 110 activates a second component. For example, as explain above, activating a component in the vehicle 105 may include deactivating the DAS activated in the block 405. If no user input has been received in the time allowed in the block 455, the computer 110 may determine to deactivate the DAS. Alternatively or additionally, the computer 110 could activate a further component to provide output to the operator, e.g., vibration of a vehicle seat, an audio output, etc.

Following the block 460, the process 400 ends. Further, although not illustrated, it is to be understood that the process 400 could end during or after other blocks. For example, if during execution of the process 400, operator input is received to deactivate a vehicle and/or the DAS, the process 400 could end.

Systems and methods described herein may be modified and/or omitted depending on the context, situation, and applicable laws, rules and regulations. Further, regardless actions that may be taken by a vehicle such as a computer controlling a vehicle, users should use good judgement and common sense when operating the vehicle. Operations described herein should always be implemented and/or performed in accordance with the owner manual and safety guidelines.

The computing devices discussed herein, including computer 110, include processors and memories. The memories generally including instructions executable by one or more of the computing devices' processors, such as instructions disclosed in the foregoing, and instructions for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby causing one or more actions and/or processes to occur, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

"Based on" means based at least in part on unless explicitly stated otherwise. Therefore, if A is "based on" B, this means that A could be entirely determined based on B, or could be determined based on B and some other factor or factors.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a processor and a memory, the memory storing instructions executable by the processor to:
   detect activation of a vehicle operator assistance system;
   determine a monitoring time and an attentiveness window;
   upon detecting attentiveness of an operator for a duration of the attentiveness window, increase the monitoring time by an adjustment increment and increment a counter;
   upon detecting inattentiveness of the operator during the duration of the attentiveness window, increment the counter; and
   upon expiration of the monitoring time, actuate a component in the vehicle based on the inattentiveness of the operator.

2. The system of claim 1, wherein the instructions further include instructions to, upon detecting inattentiveness of the operator for the duration of the attentiveness window, decrease the monitoring time by the adjustment increment.

3. The system of claim 1, wherein the attentiveness window is defined based on the adjustment increment.

4. The system of claim 1, wherein the attentiveness window is the same as the adjustment increment.

5. The system of claim 1, wherein the instructions to actuate the component in the vehicle include instructions to deactivate the vehicle operator assistance system.

6. The system of claim 1, wherein the instructions to actuate the component in the vehicle include instructions to activate a vehicle steering system.

7. The system of claim 1, wherein the instructions to actuate the component in the vehicle include instructions to activate vibration of a seat and/or a steering wheel.

8. The system of claim 1, wherein the instructions to actuate the component in the vehicle include instructions to provide output via a vehicle human interface.

9. The system of claim 1, the instructions further including instructions to, after expiration of a second monitoring time without receiving operator input, actuate a second component in the vehicle, wherein the second monitoring time is measured from expiration of the monitoring time.

10. The system of claim 1, wherein the monitoring time and/or the attentiveness window are determined based on a location of a vehicle and/or sensor data about an environment around the vehicle.

11. The system of claim 1, wherein the monitoring time and/or the attentiveness window are determined based on data about the operator.

12. The system of claim 1, wherein attentiveness of the operator is determined based on detecting an operator input to a vehicle component and/or detecting a location of the operator's hands.

13. The system of claim 1, wherein the attentiveness of the operator is determined based on detecting a gaze and/or a pose of the operator.

14. The system of claim 1, wherein the vehicle operator assistance system provides hands-free driving.

15. A method comprising:
   detecting activation of a vehicle operator assistance system;
   determining a monitoring time and an attentiveness window;
   upon detecting attentiveness of an operator for a duration of the attentiveness window, increasing the monitoring time by an adjustment increment and incrementing a counter;
   upon detecting inattentiveness of the operator during the duration of the attentiveness window, incrementing the counter; and
   upon expiration of the monitoring time, actuating a component in the vehicle based on the inattentiveness of the operator.

16. The method of claim 15, further comprising, upon detecting inattentiveness of the operator for the duration of the attentiveness window, decreasing the monitoring time by the adjustment increment.

17. The method of claim 15, wherein the attentiveness window is defined based on the adjustment increment.

18. The method of claim 15, wherein actuating the component in the vehicle includes deactivating the vehicle operator assistance system, activating a vehicle steering system, activating vibration of a seat and/or a steering wheel, or providing output via a vehicle human interface.

19. The method of claim 15, further comprising, after expiration of a second monitoring time without receiving operator input, actuating a second component in the vehicle, wherein the second monitoring time is measured from expiration of the monitoring time.

20. The method of claim 15, wherein the monitoring time and/or the attentiveness window are determined based on a location of a vehicle, data about the operator, and/or data about an environment around the vehicle.

\* \* \* \* \*